United States Patent
Sakadani et al.

(10) Patent No.: US 11,691,602 B2
(45) Date of Patent: Jul. 4, 2023

(54) VEHICLE ANTILOCK BRAKE SYSTEM CONTROL DEVICE

(71) Applicant: Mitsubishi Electric Corporation, Tokyo (JP)

(72) Inventors: Yoshiki Sakadani, Tokyo (JP); Toshihide Satake, Tokyo (JP); Yuji Shimizu, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 0 days.

(21) Appl. No.: 17/625,872

(22) PCT Filed: Oct. 29, 2019

(86) PCT No.: PCT/JP2019/042261
§ 371 (c)(1),
(2) Date: Jan. 10, 2022

(87) PCT Pub. No.: WO2021/084596
PCT Pub. Date: May 6, 2021

(65) Prior Publication Data
US 2022/0258706 A1  Aug. 18, 2022

(51) Int. Cl.
*B60T 8/1755* (2006.01)
*B60T 8/1761* (2006.01)

(52) U.S. Cl.
CPC ........ *B60T 8/1755* (2013.01); *B60T 8/17616* (2013.01); *B60T 2220/03* (2013.01);
(Continued)

(58) Field of Classification Search
CPC ...... B60T 8/1755; B60T 8/17616; B60T 8/58; B60T 2220/03; B60T 2250/03; B60T 2270/10; B60T 2270/30; B60T 2201/16
See application file for complete search history.

(56) References Cited

U.S. PATENT DOCUMENTS 5,043,898 A * 8/1991 Yoshino ................ B60T 8/1764
                                                         303/169
5,315,518 A * 5/1994 Lin ....................... B60T 8/1764
                                                         701/73
(Continued)

FOREIGN PATENT DOCUMENTS

JP          3296050 B2    6/2002
JP        2004-210104 A   7/2004

OTHER PUBLICATIONS

Viramgama, D., Intelligent Vehicle Safety Technology: Anti-lock Braking System (ABS) and its Advancements, International Research Journal of Engineering and Technology (IRJET), vol. 6, Issue 9, Sep. 2019, pp. 1158-1163, Google Scholar. (Year: 2019).*

(Continued)

*Primary Examiner* — Russell Frejd
(74) *Attorney, Agent, or Firm* — Sughrue Mion, PLLC (57) ABSTRACT

A wheeled vehicle's antilock brake system (ABS) control device has three kinds of control modes of a braking force oriented mode, a sideways force oriented swinging-motion suppression mode and a sideways force oriented swinging-motion enhancement mode each of which is an ABS control mode being selected by means of an ABS control mode selection unit; and the vehicle ABS control device is so arranged that, in accordance with an ABS control mode selected by the ABS control mode selection unit, target slip rates on each of the vehicle's wheels being set by a target slip-rate setting unit are transferred toward respective braking force orientation or sideways force orientation, thereby the behavior of a wheeled vehicle is stabilized at a time when the wheeled vehicle on which the vehicle ABS control device is mounted makes a turn.

15 Claims, 6 Drawing Sheets

(52) U.S. Cl.
CPC ....... *B60T 2250/03* (2013.01); *B60T 2270/10* (2013.01); *B60T 2270/30* (2013.01)

(56) References Cited

U.S. PATENT DOCUMENTS

| | | | | |
|---|---|---|---|---|
| 5,733,019 | A * | 3/1998 | Inagaki | B60T 8/4072 |
| | | | | 701/72 |
| 5,842,755 | A * | 12/1998 | Sugimoto | B60T 8/1766 |
| | | | | 303/113.5 |
| 5,865,513 | A * | 2/1999 | Inagaki | B60T 8/1755 |
| | | | | 303/189 |
| 2006/0220454 | A1 * | 10/2006 | Miyazaki | B60T 8/3675 |
| | | | | 303/186 |

OTHER PUBLICATIONS

International Search Report for PCT/JP2019/042261 dated Dec. 24, 2019 (PCT/ISA/210).

* cited by examiner

VEHICLE ANTILOCK BRAKE SYSTEM CONTROL DEVICE

CROSS REFERENCE TO RELATED APPLICATIONS

This application is a National Stage of International Application No. PCT/W2019/042261 filed Oct. 29, 2019.

TECHNICAL FIELD

The disclosure of the present application relates to a wheeled vehicle's antilock brake system control device.

BACKGROUND ART

An antilock brake system (Antilock Brake System, abbreviated as ABS; hereinafter, it may be referred to as "ABS" for brevity) is a device in which the stability of an automotive wheeled vehicle is increased in the brake operations at hard braking or on a low friction road by preventing a vehicle's wheel(s) from locking (for example, refer to Patent Document 1).

In addition, an ABS control device is known in which, when the difference is caused between a target yaw rate and a real yaw rate whose difference therebetween is a predetermined value or more at the time under an ABS control, namely in a case in which required sideways force is not obtained at a time when cornering or turning is made during the ABS control, a target slip rate for use under the ABS control is changed toward sideways force emphasis or orientation, so that sufficient sideways force is secured (for example, refer to Patent Document 2).

RELATED ART DOCUMENTS

Patent Documents

[Patent Document 1] Japanese Patent Laid-Open No. 2004-210104
[Patent Document 2] Japanese Patent Publication No. 3296050

SUMMARY OF THE INVENTION

Problems to be Solved by the Invention

However, in a case in which an excessively large yaw rate is caused at a time when a target slip rate is changed toward sideways force emphasis or orientation, it is feared that an automotive wheeled vehicle becomes unstable, giving rise to going for a spin.

The present disclosure in the application concerned has been directed at disclosing technologies for solving those problems as described above, an object of the disclosure is to provide a wheeled vehicle's ABS control device which is capable of stabilizing the behavior of a wheeled vehicle at a time of its turn by changing a target slip rate(s) in accordance with a driving or running state of the wheeled vehicle when it is making the turn at the time under its ABS control.

Means for Solving the Problems

A wheeled vehicle's antilock brake system control device disclosed in the disclosure of the application concerned is an antilock brake system control device of a wheeled vehicle in which the vehicle antilock brake system control device comprises:

an antilock-brake-system control mode selection unit for transferring in accordance with a running state of the wheeled vehicle between two modes of a braking force oriented mode in which target slip rates are set on all of vehicle's wheels each at a braking force oriented target slip rate by which braking force of the wheeled vehicle becomes the maximum, and a sideways force oriented swinging-motion suppression mode for suppressing yaw moment working on the wheeled vehicle by setting a target slip rate on a front wheel making a turn on an inner lateral side thereof and by setting target slip rates on two rear wheels, among all of the vehicle's wheels, each at a sideways force oriented target slip rate by which wheel's sideways force acting in a perpendicular direction with respect to a tire's rotational direction becomes larger than wheel's braking force; and a target slip-rate setting unit being capable of setting target slip rates on all of the vehicle's wheels, on each of the wheels, at a target slip rate selected from between the braking force oriented target slip rate and the sideways force oriented target slip rate by transferring therebetween in accordance with a running state of the wheeled vehicle, wherein the target slip-rate setting unit sets the target slip rates, on each of the vehicle's wheels by following a mode selected from between the two modes by the antilock-brake-system control mode selection unit, at either one of the braking force oriented target slip rate and the sideways force oriented target slip rate, at a time when the wheeled vehicle runs.

Effects of the Invention

According to the wheeled vehicle's antilock brake system control device disclosed in the disclosure of the application concerned, a target slip rate(s) is changed in accordance with a driving or running state of a wheeled vehicle when it makes a turn at the time under its ABS control, whereby it is possible to provide a wheeled vehicle's ABS control device which is capable of stabilizing the behavior of the wheeled vehicle at the time of its turn.

EMBODIMENTS FOR CARRYING OUT THE INVENTION

Embodiment 1

A brake system in use for a wheeled vehicle's ABS control device of Embodiment 1 is an electric motor-driven brake device which is easier to individually control the braking force of each of vehicle's wheels in comparison with a conventional oil-hydraulic brake device, and also which has made possible to perform the controls with higher responsivity and with a higher degree of accuracy than those by the oil-hydraulic brake device. According to this, the wheeled vehicle's ABS control device of Embodiment 1 can be achieved.

Figure 1:
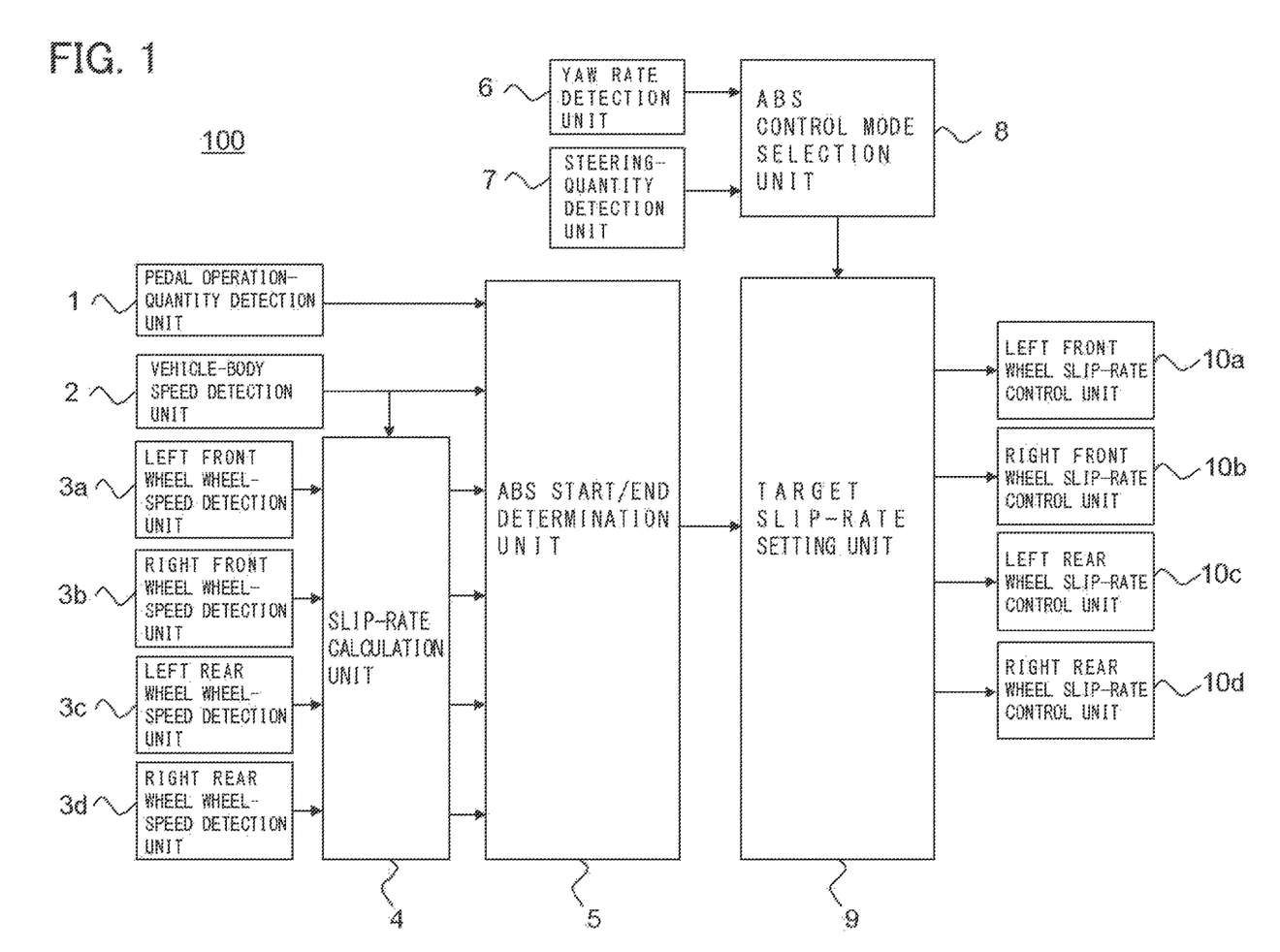
FIG. 1 is a block diagram illustrating a configuration of a wheeled vehicle's ABS control device according to Embodiment 1.

FIG. 1 is a diagram illustrating configurational blocks of a wheeled vehicle's ABS control device 100 according to Embodiment 1. In FIG. 1, a pedal operation-quantity detection unit 1 detects the quantity of brake pedal operation caused by a vehicle's driver. The quantity of brake pedal operation can be detected by a pedal stroke sensor, so that the quantity of stroke by a brake pedal is detected at the time when the vehicle's driver operates the pedal.

A vehicle-body speed detection unit 2 performs the estimation of a vehicle-body speed. The vehicle-body speed can be estimated from an engine revolution number, a rotational speed(s) of a vehicle's wheel(s), an acceleration sensor, or GPS information of a wheeled vehicle. The estimation method belongs to publicly known technologies, and so its detailed explanation is omitted here.

A left front wheel wheel-speed detection unit 3a, a right front wheel wheel-speed detection unit 3b, a left rear wheel wheel-speed detection unit 3c and a right rear wheel wheel-speed detection unit 3d detect rotational speeds of each of the vehicle's wheels from vehicle's wheel-speed sensors placed on each of the vehicle's wheels, and calculate vehicle's wheel speeds.

In a slip-rate calculation unit 4, slip rates S of each of the vehicle's wheels (a left front wheel slip rate $S_{FL}$, a right front wheel slip rate $S_{FR}$, a left rear wheel slip rate $S_{RL}$ and a right rear wheel slip rate $S_{RR}$) are calculated on the basis of a vehicle-body speed V detected by the vehicle-body speed detection unit 2 described above, and on the bases of speeds of each of the vehicle's wheels detected by the left front wheel wheel-speed detection unit 3a, the right front wheel wheel-speed detection unit 3b, the left rear wheel wheel-speed detection unit 3c and the right rear wheel wheel-speed detection unit 3d, namely on the bases of a left front wheel wheel-speed $Vw_{FL}$, a right front wheel wheel-speed $Vw_{FR}$, a left rear wheel wheel-speed $Vw_{RL}$ and a right rear wheel wheel-speed $VW_{RR}$, respectively.

Here, a slip rate (unit: %) is defined as a value which is obtained by multiplying by a factor of 100 a value being derived by dividing the difference between a vehicle-body speed and a rotational speed of a vehicle's wheel by the vehicle-body speed.

The slip rate described above takes on 0% when a wheeled vehicle is running without undergoing its braking, namely when a vehicle-body speed and a vehicle's wheel speed(s) are equal to one another. In addition, when a vehicle's wheel(s) is locked, namely when a vehicle's wheel speed(s) becomes "0," the slip rate takes on 100%. Slip rates (unit: %) of each of the vehicle's wheels described above, namely a left front wheel slip rate $S_{FL}$, a right front wheel slip rate $S_{FR}$, a left rear wheel slip rate $S_{RL}$ and a right rear wheel slip rate $S_{RR}$ can be calculated by Equation (1) through Equation (4) given below, respectively.

[Expression Figure-1]
$$S_{FL} = \frac{V - Vw_{FL}}{V} \times 100 \qquad (1)$$

[Expression Figure-2]
$$S_{FR} = \frac{V - Vw_{FR}}{V} \times 100 \qquad (2)$$

[Expression Figure-3]
$$S_{RL} = \frac{V - Vw_{RL}}{V} \times 100 \qquad (3)$$

[Expression Figure-4]
$$S_{RR} = \frac{V - Vw_{RR}}{V} \times 100 \qquad (4)$$

Determination of a start of an ABS control or an end thereof is performed by an ABS start/end determination unit 5 on the bases of the quantity of pedal operation detected by the pedal operation-quantity detection unit 1 described above and a vehicle-body speed detected by the vehicle-body speed detection unit 2 described above, and on the bases of slip rates of each of vehicle's wheels calculated by the slip-rate calculation unit 4, namely the slip rates of $S_{FL}$, $S_{FR}$, $S_{RL}$ and $S_{RR}$ described above. As for the determination of a start of the ABS control or an end thereof, the determination of which is performed by using the slip rates of each of the vehicle's wheels, or using a vehicle-body speed; however, those are publicly known technologies, and so their detailed explanation is omitted here. The ABS start/end determination unit 5 described above outputs an ABS control flag: when the ABS control flag is at "0," indicating a state in which an ABS control is not executed, and, when the ABS control flag is at "1," indicating a state in which the ABS control is executed.

A yaw rate detection unit 6 detects a yaw rate working on a wheeled vehicle by using a gyroscope sensor placed on the wheeled vehicle.

In a steering-quantity detection unit 7, the quantity of steering caused by a vehicle's driver is detected by using a steering angle sensor. However, in a case in which a wheeled vehicle is performing its automatic driving without interposing an operation caused by a vehicle's driver, it may be adopted also to detect a steering instruction from an automatic driving system.

An ABS control mode selection unit 8 performs the selection of ABS control modes on the bases of an output of the yaw rate detection unit 6 described above and that of the steering-quantity detection unit 7, as will be explained below.

ABS control modes are made of three kinds of a braking force emphasized or oriented mode, a sideways force emphasized or oriented swinging-motion suppression mode and a sideways force emphasized or oriented swinging-motion enhancement mode (the explanation for specific contents of these modes will be made later), and any one of the modes is selected among these three modes. Note that, control mode states of ABS are indicated as respective ABS mode states in the ABS control mode selection unit 8 in such a manner that: the braking force oriented mode is indicated by "0"; the sideways force oriented swinging-motion suppression mode, by "1"; and the sideways force oriented swinging-motion enhancement mode, by "2." In addition, an initial value of the ABS mode state is set at "0." Note that, "turning- or swinging-motion" is movement or motion which can be called as 'yaw moment' working on a wheeled vehicle, and the "swinging-motion property or characteristic" is determined by the magnitude of angular acceleration due to the yaw moment. In what follows, the explanation will be made for specific contents of these ABS control modes.

First, a braking force emphasized or oriented mode is a mode in which target slip rates on all of the vehicle's wheels are each set at braking force emphasized or oriented target slip rates. By executing the braking force oriented mode, high braking force can be secured though sideways force is reduced.

Next, a sideways force emphasized or oriented swinging-motion suppression mode is a mode in which target slip rates on a front wheel making a turn on an inner lateral side thereof and rear wheels are each set at sideways force oriented target slip rates, and a target slip rate on a front wheel making the turn on an outer lateral side thereof is set at a braking force oriented target slip rate. By executing the sideways force oriented swinging-motion suppression mode, moment is produced in a direction to suppress the turning- or swinging-motion of a wheeled vehicle, so that it becomes possible to curb causing an excessive yaw rate while sideways force of the wheeled vehicle is maintained.

Lastly, in a sideways force emphasized or oriented swinging-motion enhancement mode, target slip rates on a front wheel making a turn on an outer lateral side thereof and rear wheels are each set at sideways force oriented target slip rates, and a target slip rate on a front wheel making the turn on an inner lateral side thereof is set at a braking force oriented target slip rate. By executing the sideways force oriented swinging-motion enhancement mode, yaw moment is produced in a direction to promote or enhance the turning- or swinging-motion of a wheeled vehicle, so that it becomes possible to turn the wheeled vehicle in which its swinging-motion characteristic is emphasized or oriented.

Moreover, a target slip-rate setting unit 9 performs the settings of target slip rates on the bases of determination results of the starts or ends of ABS controls which have been performed by the ABS start/end determination unit 5, and also on the bases of ABS mode states being selection results of the control modes performed by the ABS control mode selection unit 8.

Furthermore, in a left front wheel slip-rate control unit 10a, a right front wheel slip-rate control unit 10b, a left rear wheel slip-rate control unit 10c and a right rear wheel slip-rate control unit 10d, respective slip rate controls are performed on each of the vehicle's wheels, on the bases of target slip rates being outputted from the target slip-rate setting unit 9.

Figure 2:
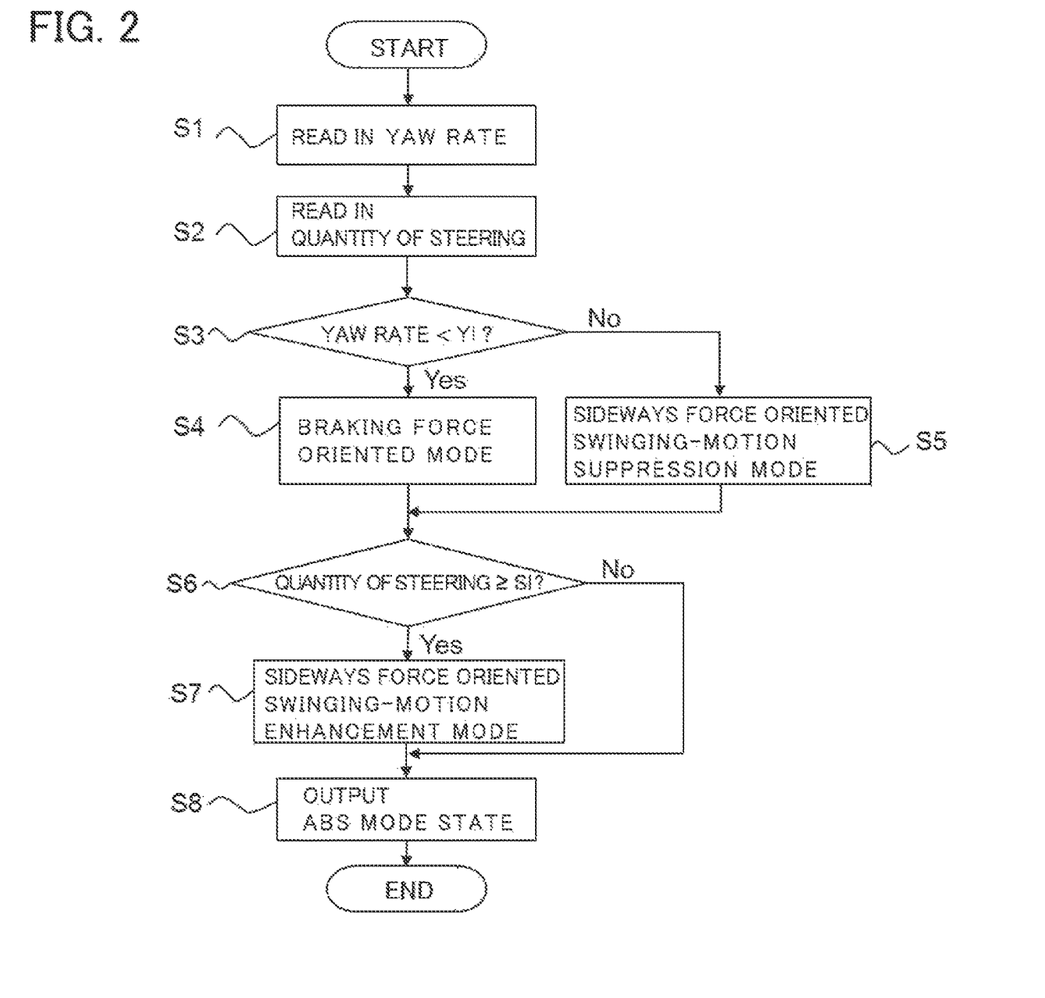
FIG. 2 is a flowchart diagram showing processing procedures of an ABS control mode selection unit.

Next, the explanation will be made referring to a flowchart of FIG. 2 for the operations of the ABS control mode selection unit 8 as follows. FIG. 2 is the flowchart showing processing procedures of the ABS control mode selection unit 8 described above.

In FIG. 2, first, at Step S1, a read-in process of a yaw rate detected by the yaw rate detection unit 6 described above is performed. In addition, at Step S2, a read-in process of the quantity of steering detected by the steering-quantity detection unit 7 described above is performed.

When a yaw rate having been read in at Step S1 described above is less than a threshold value Yl (symbol "l" stands for 'el' which is applicable hereinafter in a similar fashion), it is estimated that a wheeled vehicle undergoes a straight-ahead running state; and thus, a control mode of ABS is defined as a braking force oriented mode, and an ABS mode state is set at "0." (Step S3, Step S4)

When the yaw rate is the value "Yl" or more at Step S3 described above, it is estimated that the wheeled vehicle undergoes cornering or turning; and thus, the control mode of ABS is defined as a sideways force oriented swinging-motion suppression mode, and the ABS mode state is set at "1." (Step S5)

When the quantity of steering having been read in at Step S2 described above is a threshold value S1 (symbol "l" stands for 'el' which is applicable hereinafter in a similar fashion) or more, it is estimated that a high level of swinging-motion characteristic of the wheeled vehicle is necessary; and thus, the ABS control mode is defined as a sideways force oriented swinging-motion enhancement mode, and the ABS mode state is set at "2." (Step S6, Step S7)

As the explanation is made referring to FIG. 2, the output of an ABS mode state described above is performed at Step S8 by making the correspondence to a respective case of all of yaw rates, and to that of all of quantities of steering.

Figure 3:
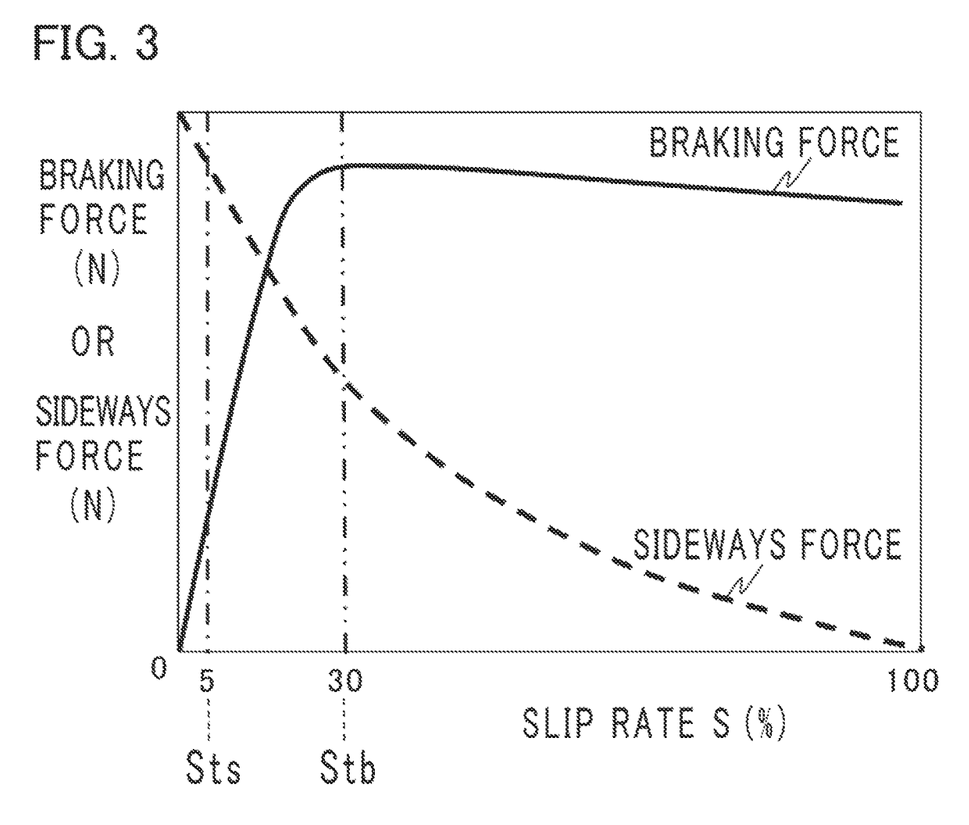
FIG. 3 is a diagram graphically showing the relationship between a slip rate and braking force working on a vehicle's wheel, and the relationship between that and sideways force working thereon.

Next, the explanation will be made referring to FIG. 3 for the relationship between a slip rate and braking force working on a vehicle's wheel, and for the relationship between the slip rate and sideways force working thereon. FIG. 3 is a graph showing the relationship between a slip rate and braking force working on a vehicle's wheel (in the figure, refer to the curve shown by the bold, solid line), and the relationship between the slip rate and sideways force working thereon (in the figure, refer to the curve shown by the bold, broken lines): the horizontal axis indicates a slip rate S (unit: %); the vertical axis on the left-hand side, the braking force (unit: N); and the vertical axis on the right-hand side, the sideways force (unit: N).

In addition, symbol "Stb" (a slip rate in the degree of 30%) indicated in FIG. 3 stands for a braking force oriented target slip rate at which the braking force reaches the maximum. Moreover, symbol "Sts" (a slip rate in the degree of 5%) stands for a sideways force oriented target slip rate at which sideways force working on a vehicle's wheel is emphasized or oriented to work thereon. Usually, the braking force working on a vehicle's wheel becomes the maximum when a slip rate is in the degree of 30%. Meanwhile, the sideways force becomes the maximum when the slip rate is at 0%, whereas the sideways force becomes "0" when it is at 100%.

That is to say, when a target slip rate of a vehicle's wheel is set at "Stb," high braking force can be outputted; however, sideways force is reduced, and so, cornering or turning performance of a wheeled vehicle is lowered. In addition, when the target slip rate thereof is set at "Sts," sideways force working on the vehicle's wheel is enhanced; however, braking force is reduced, and so, a braking distance of the wheeled vehicle becomes longer.

In the wheeled vehicle's ABS control device according to the embodiment, the control is performed in accordance with a driving or running state of a wheeled vehicle by dividing into three modes of a braking force oriented mode, a sideways force oriented swinging-motion suppression mode and a sideways force oriented swinging-motion enhancement mode; and thus, it is so arranged that, in accordance with each of the modes, a target slip rate on each of vehicle's wheels, namely the target slip rate on each of a left front wheel, a right front wheel, a left rear wheel and a right rear wheel is changed over or transferred between a braking force oriented target slip rate (Stb) and a sideways force oriented target slip rate (Sts).

Figure 4:
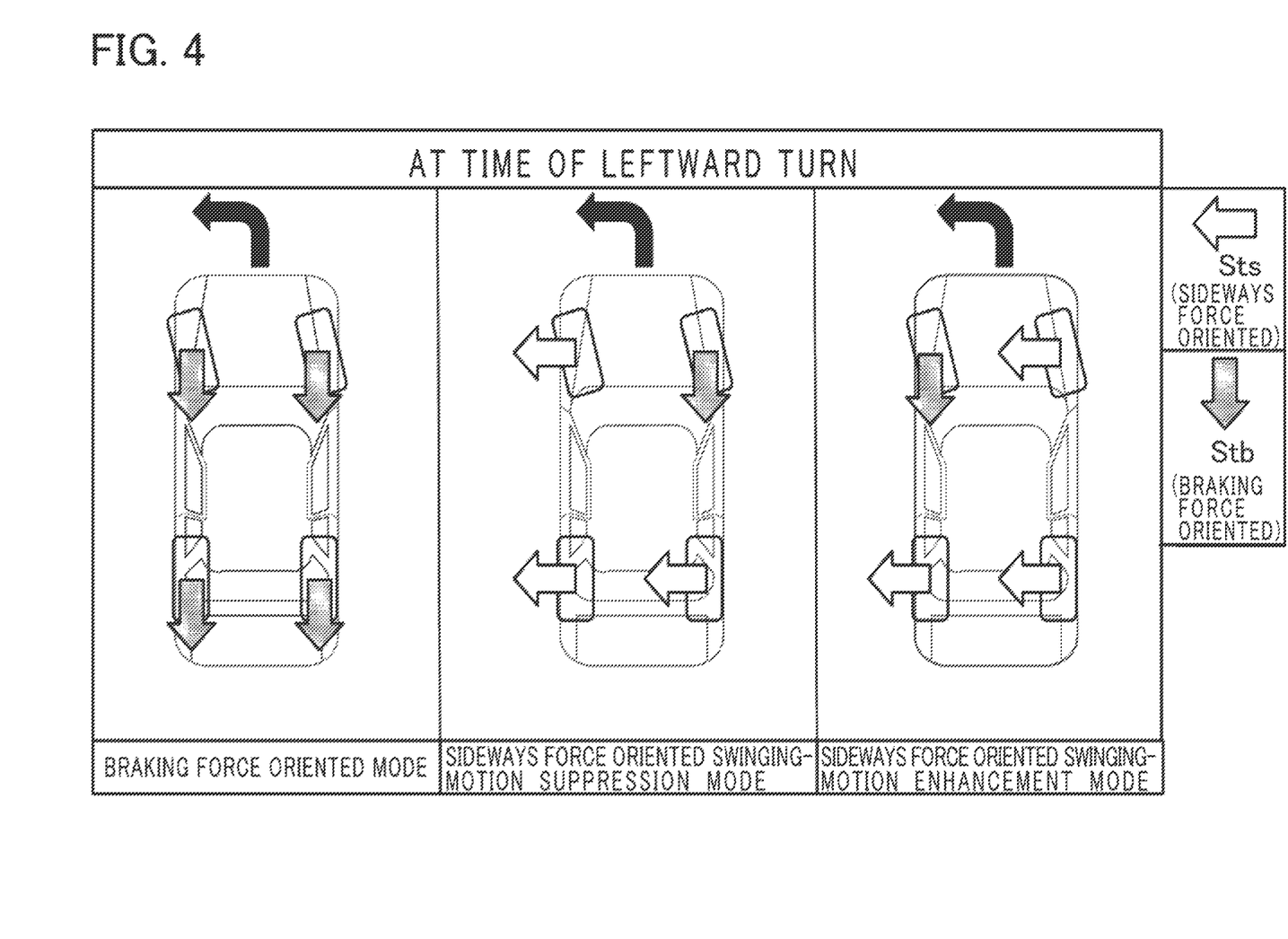
FIG. 4 is a diagram illustrating, in each of ABS control modes, whether a target slip rate of each of vehicle's wheels is oriented at either one of a target slip rate of braking force and that of sideways force.

FIG. 4 is a model diagram illustrating, in each of the ABS control modes described above, whether a target slip rate on each of vehicle's wheels, namely a target slip rate on a left front wheel, that on a right front wheel, that on a left rear wheel or that on a right rear wheel is emphasized or oriented at either one of a target slip rate of braking force and that of sideways force.

The large rectangular frame shows that the figure is the model diagram indicating a case in which a wheeled vehicle turns around leftward. Within the large rectangular frame, the small rectangular frame on the far left-hand side is a model diagram showing a braking force oriented mode; the small rectangular frame in the middle, a model diagram showing a sideways force oriented swinging-motion suppression mode; and the small rectangular frame on the right-hand side, a model diagram showing a sideways force oriented swinging-motion enhancement mode. Also in these views in any one of the small rectangular frames, the left and right front wheels are directed in their inclinations toward the left-hand side (they have slip angles) with respect to the left and right rear wheels.

Moreover, black curved arrows in the figure each indicate turning directions of the wheeled vehicle; and, in FIG. 4, indicated is a case of the time when the wheeled vehicle turns around leftward in any one of the modes. Furthermore, a hollow leftward arrow in the figure indicates that sideways force is emphasized or oriented to work on a vehicle's respective wheel corresponding to the arrow. In addition, a dense downward arrow indicates that braking force is emphasized or oriented to work on a vehicle's respective wheel corresponding to the arrow. Note that, in the manner described above, the explanation is made here while it omits centrifugal force and/or centripetal force working on a vehicle body at the time of cornering or turning.

Here, in the braking force oriented mode, target slip rates on all of the vehicle's four wheels are set at "Stb" each being a braking force oriented target slip rate.

In addition, in the sideways force oriented swinging-motion suppression mode, target slip rates on the front wheel making its turn on its inner lateral side and on the two rear wheels each among the vehicle's four wheels are set at "Sts" each being a sideways force oriented target slip rate, and a target slip rate on the front wheel making its turn on its outer lateral side is set at "Stb" being a braking force oriented target slip rate.

Moreover, in the sideways force oriented swinging-motion enhancement mode, target slip rates on the front wheel making its turn on its outer lateral side and the two rear wheels each are set at "Sts" each being a sideways force oriented target slip rate, and a target slip rate on the front wheel making its turn on its inner lateral side is set at "Stb" being a braking force oriented target slip rate.

Figure 5:
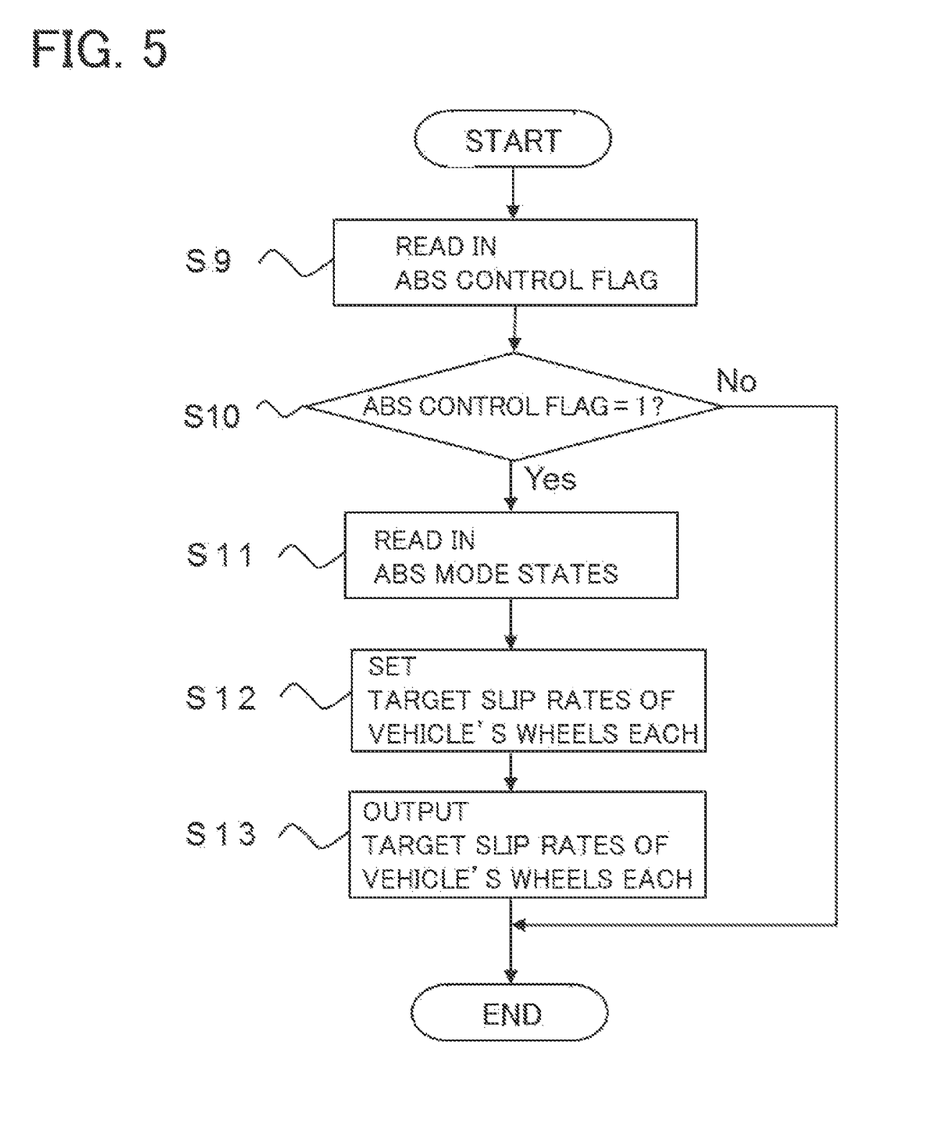
FIG. 5 is a flowchart diagram showing processing procedures of a target slip-rate setting unit.

Next, the explanation will be made referring to a flowchart of FIG. 5 for the operations of the target slip-rate setting unit 9 as follows. FIG. 5 is the flowchart showing processing procedures of the target slip-rate setting unit 9 described above.

First, at Step S9, a read-in process of an ABS control flag outputted by the ABS start/end determination unit 5 (refer to FIG. 1) is performed.

Next, when the ABS control flag described above is set at "0," the processing of the target slip-rate setting unit is ended. When the ABS control flag is set at "1," a read-in process of ABS mode states being outputted by the ABS control mode selection unit 8 described above is performed. (Step S10 and Step S11)

Subsequently, at Step S12, by following the ABS mode states each being read in at Step S11 described above, target slip rates on each of the vehicle's wheels, namely those on a left front wheel, a right front wheel, a left rear wheel and a right rear wheel are each set at either a braking force oriented target slip rate or a sideways force oriented target slip rate.

Lastly, at Step S13, target slip rates having been set at Step S12 described above on each of the vehicle's wheels, namely those on the left front wheel, the right front wheel, the left rear wheel and the right rear wheel are outputted.

According to a slip rate control, braking force working on each of the vehicle's wheels described above is controlled so that an actual slip rate (real slip rate) follows after a target slip rate; however, a control scheme in this case belongs to publicly known technologies, and so its detailed explanation is omitted here.

It should be noted that, in a sideways force oriented swinging-motion suppression mode, respective front and rear wheels making a turn on an inner lateral side thereof may be set at "Sts" each being a sideways force oriented target slip rate, and respective front and rear wheels making the turn on an outer lateral side thereof may be set at "Stb" each being a braking force oriented target slip rate.

In addition, in a sideways force oriented swinging-motion enhancement mode, respective front and rear wheels making a turn on an inner lateral side thereof may be set at "Stb" each being a braking force oriented target slip rate, and respective front and rear wheels making the turn on an outer lateral side thereof may be set at "Sts" each being a sideways force oriented target slip rate.

Moreover, the braking force oriented target slip rate (Stb) and/or the sideways force oriented target slip rate (Sts) may be changed in accordance with wheeled vehicle's specification data (a height of the center of gravity of the wheeled vehicle, or tire characteristics thereof), or a wheeled vehicle's driving or running state (a speed of the wheeled vehicle, or acceleration thereof), and in accordance with road-surface friction force.

Figure 6:
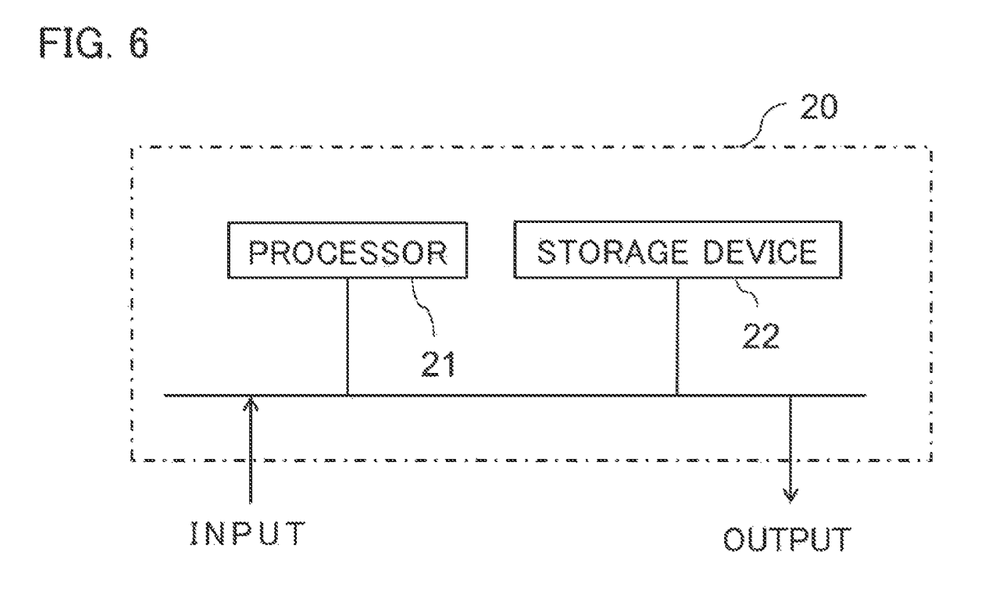
FIG. 6 is a diagram showing an example of a hardware configuration for executing signal processing of the wheeled vehicle's ABS control device according to Embodiment 1.

It should be noted that shown in FIG. 6 is an example of hardware 20 according to signal processing of an wheeled vehicle's antilock brake control device disclosed in the disclosure of the application concerned. As shown in the figure, a processor 21 and a storage device 22 are included in the hardware 20 according to the signal processing of the control device. The storage device is provided with a volatile storage device of a random access memory (RAM) or the like, and with a nonvolatile auxiliary storage device of a flash memory or the like, which are not shown in the figure. In addition, in place of the flash memory, an auxiliary storage device of a hard disk may be provided with. The processor 21 executes a program(s) inputted from the storage device 22. In this case, the program(s) is inputted into the processor 21 from the auxiliary storage device by way of the volatile storage device. Moreover, the processor 21 may output its data of a calculated result(s) or the like into the volatile storage device of the storage device 22, or may store the data into the auxiliary storage device by way of the volatile storage device.

In the disclosure of the application concerned, exemplary embodiments are described; however, various features, aspects and functions described in embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arises such a case that is included as a case in which at least one constituent element is modified, added or eliminated.

EXPLANATION OF NUMERALS AND SYMBOLS

Numeral "1" designates a pedal operation-quantity detection unit; "2," vehicle-body speed detection unit; "3a," left front wheel wheel-speed detection unit; "3b," right front wheel wheel-speed detection unit; "3c," left rear wheel wheel-speed detection unit; "3d," right rear wheel wheel-speed detection unit; "4," slip-rate calculation unit; "5," ABS start/end determination unit; "6," yaw rate detection unit; "7," steering-quantity detection unit; "8," ABS control mode selection unit; "9," target slip-rate setting unit; "10a," left front wheel slip-rate control unit; "10b," right front wheel slip-rate control unit; "10c," left rear wheel slip-rate control unit; "10d," right rear wheel slip-rate control unit; "20," hardware; "21," processor; "22," storage device; and "100," wheeled vehicle's ABS control device.

What is claimed is:

1. A vehicle antilock brake system control device being an antilock brake system control device of a wheeled vehicle, the vehicle antilock brake system control device, comprising:
   an antilock-brake-system control mode selection circuitry for transferring in accordance with a running state of a wheeled vehicle between two modes of a braking force oriented mode in which target slip rates are set on all of vehicle's wheels each at a braking force oriented target slip rate by which braking force of the wheeled vehicle becomes a maximum, and a sideways force oriented swinging-motion suppression mode for suppressing yaw moment working on the wheeled vehicle by setting a target slip rate on a front wheel making a turn on an inner lateral side thereof and by setting target slip rates on two rear wheels, among all of the vehicle's wheels, each at a sideways force oriented target slip rate by which wheel's sideways force acting in a perpendicular direction with respect to a tire's rotational direction becomes larger than wheel's braking force; and
   a target slip-rate setting circuitry being capable of setting target slip rates on all of the vehicle's wheels, on each of the wheels, at a target slip rate selected from between the braking force oriented target slip rate and the sideways force oriented target slip rate by transferring therebetween in accordance with a running state of the wheeled vehicle, wherein
   the target slip-rate setting circuitry sets said target slip rates, on each of the vehicle's wheels by following a mode selected from between the two modes by the antilock-brake-system control mode selection circuitry, at either one of the braking force oriented target slip rate and the sideways force oriented target slip rate, at a time when the wheeled vehicle runs.

2. The vehicle antilock brake system control device as set forth in claim 1, wherein the antilock-brake-system control mode selection circuitry further includes a sideways force oriented swinging-motion enhancement mode for enhancing yaw moment working on the wheeled vehicle by setting a target slip rate on a front wheel making a turn on an outer lateral side thereof and by setting target slip rates on two rear wheels, among all of the vehicle's wheels, each at a sideways force oriented target slip rate by which said wheel's sideways force becomes larger than wheel's braking force; and the antilock-brake-system control mode selection circuitry is capable of setting three modes of the braking force oriented mode, the sideways force oriented swinging-motion suppression mode and the sideways force oriented swinging-motion enhancement mode by transferring from one mode to another.

3. The vehicle antilock brake system control device as set forth in claim 2, wherein, when the antilock-brake-system control mode selection circuitry selects the sideways force oriented swinging-motion enhancement mode, the target slip-rate setting circuitry sets said target slip rate on a front wheel making a turn on an inner lateral side thereof at a braking force oriented target slip rate, or sets said target slip rates each on a front wheel making a turn on an inner lateral side thereof and on a rear wheel making the turn on the inner lateral side thereof at braking force oriented target slip rates; and, among all of the vehicle's wheels, the target slip-rate setting circuitry sets said target slip rates on all of vehicle's other wheels, which are not set at the braking force oriented target slip rates, each at a sideways force oriented target slip rate.

4. The vehicle antilock brake system control device as set forth in claim 3, further comprising:
   a yaw rate detector for detecting a running state of the wheeled vehicle, wherein
   the antilock-brake-system control mode selection circuitry selects the sideways force oriented swinging-motion suppression mode when the yaw rate detector detects a yaw rate which is a predetermined threshold value or more.

5. The vehicle antilock brake system control device as set forth in claim 3, further comprising:
   a steering-quantity detector for detecting a quantity of steering caused by a vehicle's driver, wherein
   the antilock-brake-system control mode selection circuitry selects the sideways force oriented swinging-motion enhancement mode when the steering-quantity detector detects a quantity of steering which is at a predetermined threshold value or more.

6. The vehicle antilock brake system control device as set forth in claim 2, further comprising:
   a steering-quantity detector for detecting a quantity of steering caused by a vehicle's driver, wherein
   the antilock-brake-system control mode selection circuitry selects the sideways force oriented swinging-motion enhancement mode when the steering-quantity detector detects a quantity of steering which is at a predetermined threshold value or more.

7. The vehicle antilock brake system control device as set forth in claim 2, wherein, when the antilock-brake-system control mode selection circuitry selects the braking force oriented mode, the target slip-rate setting circuitry sets said target slip rates on all of the vehicle's wheels each at braking force oriented target slip rates.

8. The vehicle antilock brake system control device as set forth in claim 2, wherein, when the antilock-brake-system control mode selection circuitry selects the sideways force oriented swinging-motion suppression mode, the target slip-rate setting circuitry sets said target slip rate on a front wheel making a turn on an outer lateral side thereof at a braking force oriented target slip rate, or sets said target slip rates each on a front wheel making a turn on an outer lateral side thereof and on a rear wheel making the turn on the outer lateral side thereof at braking force oriented target slip rates; and, among all of the vehicle's wheels, the target slip-rate setting circuitry sets said target slip rates on all of vehicle's other wheels, which are not set at the braking force oriented target slip rates, each at a sideways force oriented target slip rate.

9. The vehicle antilock brake system control device as set forth in claim 2, further comprising:
a yaw rate detector for detecting a running state of the wheeled vehicle, wherein
the antilock-brake-system control mode selection circuitry selects the sideways force oriented swinging-motion suppression mode when the yaw rate detector detects a yaw rate which is a predetermined threshold value or more.

10. The vehicle antilock brake system control device as set forth in claim 1, wherein, when the antilock-brake-system control mode selection circuitry selects the braking force oriented mode, the target slip-rate setting circuitry sets said target slip rates on all of the vehicle's wheels each at braking force oriented target slip rates.

11. The vehicle antilock brake system control device as set forth in claim 10, wherein, when the antilock-brake-system control mode selection circuitry selects the sideways force oriented swinging-motion suppression mode, the target slip-rate setting circuitry sets said target slip rate on a front wheel making a turn on an outer lateral side thereof at a braking force oriented target slip rate, or sets said target slip rates each on a front wheel making a turn on an outer lateral side thereof and on a rear wheel making the turn on the outer lateral side thereof at braking force oriented target slip rates; and, among all of the vehicle's wheels, the target slip-rate setting circuitry sets said target slip rates on all of vehicle's other wheels, which are not set at the braking force oriented target slip rates, each at a sideways force oriented target slip rate.

12. The vehicle antilock brake system control device as set forth in claim 10, further comprising:
a yaw rate detector for detecting a running state of the wheeled vehicle, wherein
the antilock-brake-system control mode selection circuitry selects the sideways force oriented swinging-motion suppression mode when the yaw rate detector detects a yaw rate which is a predetermined threshold value or more.

13. The vehicle antilock brake system control device as set forth in claim 1, wherein, when the antilock-brake-system control mode selection circuitry selects the sideways force oriented swinging-motion suppression mode, the target slip-rate setting circuitry sets said target slip rate on a front wheel making a turn on an outer lateral side thereof at a braking force oriented target slip rate, or sets said target slip rates each on a front wheel making a turn on an outer lateral side thereof and on a rear wheel making the turn on the outer lateral side thereof at braking force oriented target slip rates; and, among all of the vehicle's wheels, the target slip-rate setting circuitry sets said target slip rates on all of vehicle's other wheels, which are not set at the braking force oriented target slip rates, each at a sideways force oriented target slip rate.

14. The vehicle antilock brake system control device as set forth in claim 13, further comprising:
a yaw rate detector for detecting a running state of the wheeled vehicle, wherein
the antilock-brake-system control mode selection circuitry selects the sideways force oriented swinging-motion suppression mode when the yaw rate detector detects a yaw rate which is a predetermined threshold value or more.

15. The vehicle antilock brake system control device as set forth in claim 1, further comprising:
a yaw rate detector for detecting a running state of the wheeled vehicle, wherein
the antilock-brake-system control mode selection circuitry selects the sideways force oriented swinging-motion suppression mode when the yaw rate detector detects a yaw rate which is a predetermined threshold value or more.

* * * * *